United States Patent
Lubischer et al.

(10) Patent No.: US 10,533,705 B2
(45) Date of Patent: Jan. 14, 2020

(54) METHOD FOR COOLING AND/OR HEATING LUBRICANT IN AN EXCHANGEABLE MILLING DRUM BOX OF A GROUND MILLING MACHINE, EXCHANGEABLE MILLING DRUM BOX, AND GROUND MILLING MACHINE

(71) Applicant: BOMAG GmbH, Boppard (DE)

(72) Inventors: Bernd Lubischer, Boppard (DE); Marco Reuter, Emmelshausen (DE); Jens-Martin Zehbe, Schoeningen (DE)

(73) Assignee: BOMAG GmbH, Boppard (DE)

(*) Notice: Subject to any disclaimer, the term of this patent is extended or adjusted under 35 U.S.C. 154(b) by 228 days.

(21) Appl. No.: 15/483,254

(22) Filed: Apr. 10, 2017

(65) Prior Publication Data

US 2017/0292649 A1 Oct. 12, 2017

(30) Foreign Application Priority Data

Apr. 8, 2016 (DE) .................. 10 2016 004 271

(51) Int. Cl.
*E01C 23/088* (2006.01)
*E01C 23/12* (2006.01)
(Continued)

(52) U.S. Cl.
CPC ............ *F16N 39/02* (2013.01); *E01C 23/088* (2013.01); *E01C 23/127* (2013.01); *E21C 25/08* (2013.01);
(Continued)

(58) Field of Classification Search
CPC .. E01C 23/088; E01C 23/127; F16H 57/0412; F16H 57/0415; F16H 57/0417; F16N 2021/005; F16N 39/02; F16N 39/04
(Continued)

(56) References Cited

U.S. PATENT DOCUMENTS 4,342,485 A * 8/1982 Tuneblom ............ E01C 23/088
299/39.8
4,633,938 A * 1/1987 Schunck ............ F16H 57/0493
165/47
(Continued)

FOREIGN PATENT DOCUMENTS

DE 102012010947 A1 7/2013

OTHER PUBLICATIONS

Wikipedia, Heat Exchanger, Article retrieved from htttps://en.wikipedia.org/wiki/Heat_exchanger on Jul. 31, 2019 (19 pages).

*Primary Examiner* — David J Bagnell
*Assistant Examiner* — Michael A Goodwin
(74) *Attorney, Agent, or Firm* — Wood Herron & Evans LLP

(57) ABSTRACT

The present invention relates to an exchangeable milling drum box for a ground milling machine, particularly for a road milling machine, a recycler, a stabilizer or a surface miner, with a milling drum rotatably mounted in the exchangeable milling drum box and a transmission, via which the milling drum can be driven, the transmission comprising a lubrication device with a lubricant, and the exchangeable milling drum box comprising a cooling and/or heating device for lubricant. Furthermore, the present invention relates to a ground milling machine having such an exchangeable milling drum box. The present invention also relates to a method for cooling and/or heating lubricant of a transmission of a milling drum mounted rotatably in an exchangeable milling drum box of a ground milling machine, the method comprising the steps: Supplying cooling and/or a heating medium from the ground milling machine to the lubricant located in a lubrication device arranged on the exchangeable milling drum box; cooling and/or heating the lubricant through heat transfer between the coolant and/or heating medium and the lubricant; and (Continued)

discharging the cooling and/or heating medium from the exchangeable milling drum box to the ground milling machine.

16 Claims, 3 Drawing Sheets

(51) Int. Cl.
  *F16N 39/02* (2006.01)
  *E21C 25/08* (2006.01)
  *E21C 31/12* (2006.01)
  *F16N 39/04* (2006.01)
  *F16N 39/06* (2006.01)

(52) U.S. Cl.
  CPC .............. *E21C 31/12* (2013.01); *F16N 39/04* (2013.01); *F16N 39/06* (2013.01)

(58) Field of Classification Search
  USPC ........................................ 184/104.1; 180/339
  See application file for complete search history.

(56) References Cited

U.S. PATENT DOCUMENTS

| | | | |
|---|---|---|---|
| 4,861,187 A * | 8/1989 | Sinkkonen | B60K 11/02 404/72 |
| 10,100,712 B2 | 10/2018 | Baldus et al. | |
| 2008/0314572 A1 * | 12/2008 | Hommes | F01M 5/002 165/166 |
| 2011/0061744 A1 * | 3/2011 | Zillig | F15B 21/042 137/15.01 |
| 2011/0148177 A1 * | 6/2011 | Busley | E01C 23/088 299/39.2 |
| 2012/0284989 A1 * | 11/2012 | Busley | E01C 23/088 29/428 |
| 2015/0337506 A1 * | 11/2015 | Reuter | E01C 23/088 299/39.4 |
| 2015/0369354 A1 * | 12/2015 | Chudy | F16H 57/0483 165/41 |
| 2016/0040371 A1 | 2/2016 | Roetsch et al. | |
| 2016/0040372 A1 * | 2/2016 | Eiden | E01C 23/088 29/426.1 |
| 2017/0082188 A1 * | 3/2017 | McKimpson | F16H 57/01 |
| 2017/0130406 A1 | 5/2017 | Steeg et al. | |
| 2017/0130407 A1 | 5/2017 | Laux et al. | |
| 2017/0174114 A1 | 6/2017 | Schomaker et al. | |
| 2017/0174421 A1 | 6/2017 | Schomaker et al. | |
| 2017/0174422 A1 | 6/2017 | Schomaker et al. | |

\* cited by examiner

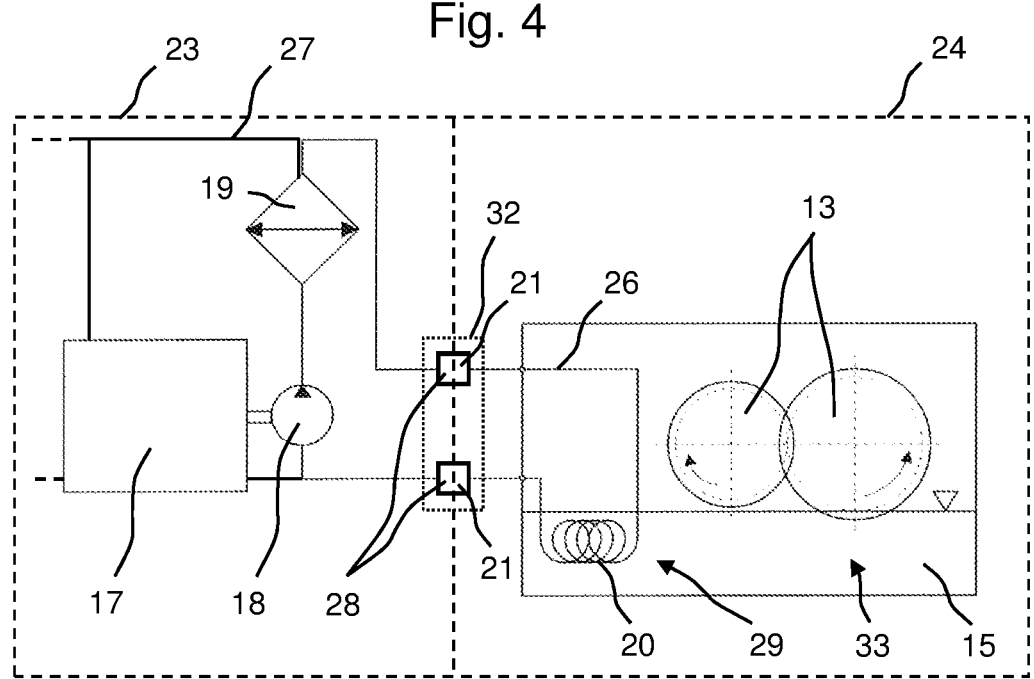
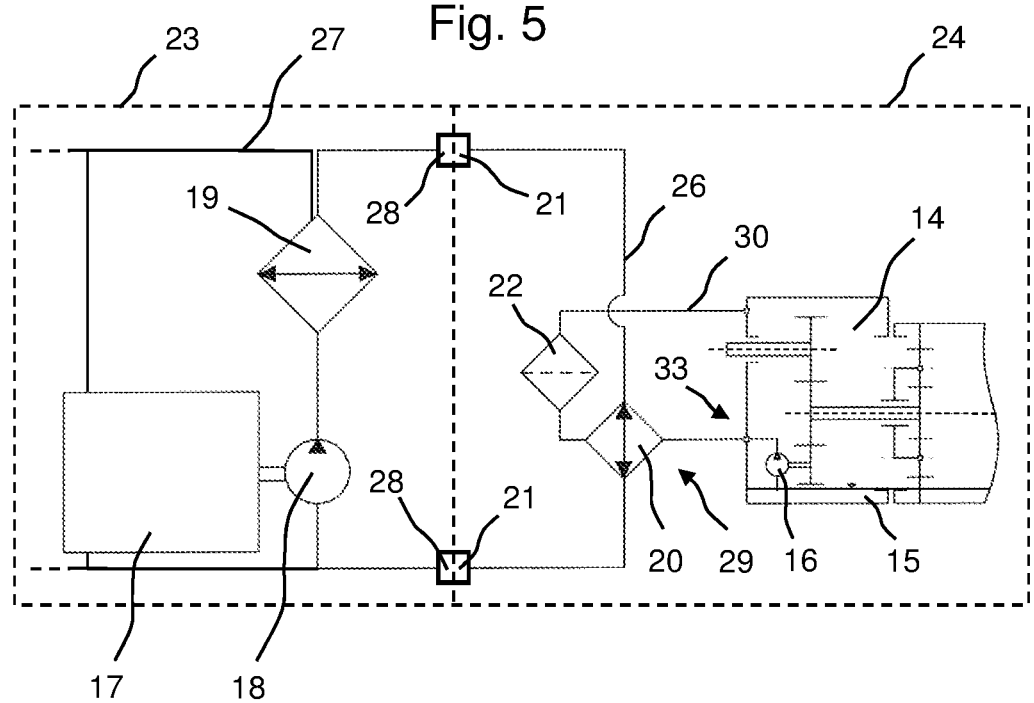

METHOD FOR COOLING AND/OR HEATING LUBRICANT IN AN EXCHANGEABLE MILLING DRUM BOX OF A GROUND MILLING MACHINE, EXCHANGEABLE MILLING DRUM BOX, AND GROUND MILLING MACHINE

CROSS-REFERENCE TO RELATED APPLICATION

The present application claims priority under 35 U.S.C. § 119 of German Patent Application No. 10 2016 004 271.0, filed Apr. 8, 2016, the disclosure of which is hereby incorporated herein by reference in its entirety.

FIELD OF THE INVENTION

The present invention relates to an exchangeable milling drum box of a ground milling machine, in particular a road milling machine, a recycler, a stabilizer or a surface miner, with a milling drum mounted rotatably in the exchangeable milling drum box and a transmission, by means of which the milling drum can be driven, the transmission comprising a lubrication device with a lubricant. The present invention also relates to a ground milling machine having such an exchangeable milling drum box. Moreover, the present invention relates to a method for cooling and/or heating lubricant of a transmission of a milling drum of a ground milling machine that is rotatably mounted in an exchangeable milling drum box.

BACKGROUND OF THE INVENTION

Generic ground milling machines, such as road milling machines, recyclers, stabilizers and surface miners, are used in road and path construction or in the surface mining of natural resources. The working tool of these machines is a milling drum, which is rotatably mounted in a milling drum box and which can be driven by the power unit of the ground milling machine by means of a transmission. During working operation of the ground milling machine, the ground milling machine is moved over the ground by means of travelling devices, while the rotating milling drum mills off ground material. The milling drum box encloses the milling drum like a cover opened towards the ground and, on the one hand, prevents loosened milled material from being thrown out of the milling drum box, and, on the other hand, either directs the milled material to a discharge conveyor belt by means of which the milled material can be transferred to a transport vehicle and carted off, or ensures a defined depositing of the milled material on the ground.

The shape of the milling drum box is adapted to the milling drum. In order to be able to use, for example, milling drums of different widths and/or equipped in a different fashion, which are adapted to a given particular operational situation, together with the same ground milling machine, it is known to remove the entire milling drum box from the ground milling machine and to mount another milling drum box, which is equipped with the milling drum adapted to the particular situation, on the ground milling machine. As the milling drum boxes and corresponding milling drums are large and very heavy machine components, mounting them on or removing them from the ground milling machine can be a complicated and sometimes time-consuming process. Consequently, special exchangeable milling drum boxes have been developed, which allow a particularly quick and easy dismounting and mounting on the ground milling machine. These types of ground milling machines with special exchangeable milling drum boxes are described, for example, in the applications DE 10 2014 011 856, DE 10 2015 016 620, DE 10 2015 016 671, DE 10 2015 016 672, DE 10 2015 016 678, and DE 10 2015 016 679. In order to emphasize the modular design of a ground milling machine having an exchangeable milling drum box, reference will also be made below to a machine part of the ground milling machine and an exchangeable milling drum box. In this connection, the machine part of the ground milling machine designates all parts of the ground milling machine that are not part of the exchangeable milling drum box and which remain on the ground milling machine after dismounting the exchangeable milling drum box.

Thus, in addition to the components pertaining to the exchangeable milling drum box itself, the exchangeable milling drum box normally comprises a milling drum and parts of the drive train. For example, an exchangeable milling drum box frequently comprises a transmission, normally in the form of a planetary gear, which, on its drive side, can be connected to a drive train of the ground milling machine, for example, via a belt or chain gear or a hydraulic connection, and, on its output side, drives the milling drum. This transmission usually has a lubrication device, the function of which is to supply the transmission with lubricant. As the lubricant heats up during operation of the ground milling machine, it must be cooled. For this purpose, the lubricant is normally conveyed from the milling drum box to a heat exchanger/cooler on the machine part of the ground milling machine. This heat exchanger/cooler is connected, for example, to a hydraulic fluid cooling circuit or a cooling water circuit of the machine part of the ground milling machine or is passed through a cooling fan airstream. In addition to cooling the lubricant, the latter can advantageously also be heated after a cold start of the machine by means of the heat exchanger, whereby the viscosity of the lubricant is reduced faster after starting the ground milling machine, which reduces wear on the gear parts and, for example, on a lubricant pump. The problem with this design for cooling and/or heating lubricant when using exchangeable milling drum boxes is that there is a relatively large amount of lubricant in those parts of the lubricant circuit that are arranged on the machine part of the ground milling machine. If the ground milling machine is turned off, a portion of this lubricant runs from the machine part back into the transmission of the milling drum, i.e., into the exchangeable milling drum box. Thus, the lubricant is distributed over the machine part and the exchangeable milling drum box. The amount of lubricant removed from the ground milling machine with an exchangeable milling drum box thus varies depending on how long the ground milling machine has already been shut off prior to removal and, consequently, how much time the lubricant has had to flow back into the transmission. Thus, in particular, where multiple exchangeable milling drum boxes are used, excessive amounts of lubricant can either be stepwise removed or supplied to the ground milling machine, which leads to problems with respect to lubricant balance. Current developments in exchangeable milling drum boxes thus result in the described challenges regarding the lubricant balance in the ground milling machine.

The object of the present invention, therefore, is to overcome the described problems regarding the lubricant balance, in particular ground milling machines having exchangeable milling drum boxes.

SUMMARY OF THE INVENTION

Specifically, the object can be achieved with an exchangeable milling drum box as described above, comprising a cooling and/or heating device for lubricant. The lubricant is, for example, a lubricating oil. Unlike known prior art arrangements, the cooling and/or heating device, according to one embodiment of the present invention, is arranged directly on the exchangeable milling drum box and is removed together with the box from the machine part of the ground milling machine during a drum change. According to one embodiment of the present invention, the cooling and/or heating device for the lubricant is not arranged on the machine part of the ground milling machine. The cooling and/or heating device for the lubricant in the present context is characterized in that it constitutes the device with which thermal energy is supplied to (heating device) or removed from (cooling device) the lubricant. As a result of the arrangement of the cooling and/or heating device on the exchangeable milling drum box, it is possible that the exchangeable milling drum box comprises a self-contained lubricant circuit for the transmission of the milling drum. This lubricant circuit is arranged exclusively on the exchangeable milling drum box. Therefore, no lubricant needs to be pumped from the exchangeable milling drum box to the machine part of the ground milling machine and vice versa. The lubricant for the exchangeable milling drum box thus circulates exclusively within the exchangeable milling drum box. This results in substantially shorter paths for the lubricant, as a result of which significantly less lubricant is needed than in the prior art. In addition, the reduced amount of lubricant prevents the transmission from being completely flooded with lubricant when the ground milling machine is shut off. Moreover, in the case of a cold start, the overall reduced amount of lubricant results in the ground milling machine reaching the desired operating temperature substantially faster, and less wear caused by the increased viscosity of the lubricant after a cold start occurs at the transmission and the rest of the lubricant circuit. As all the lubricant remains with the exchangeable milling drum box, the problem previously existing in the prior art, namely that the overall amount of lubricant in the system of the ground milling machine is increased or reduced when exchanging the exchangeable milling drum box, is eliminated.

The cooling and/or heating device may comprise, for example, an electrical heater or a cooling unit, with which heat can be supplied to or removed from the lubricant. In this case, energy in the heater, for example, electric energy, is converted into thermal energy, which is then used to heat the lubricant. In a cooling unit, energy, for example, electric energy, is used to remove thermal energy from a further medium, and the further medium can then be used to cool the lubricant. According to one embodiment of the present invention, however, in order to enable a simple design and efficient operation, the cooling and/or heating device comprises a heat exchanger. The heat exchanger is designed in such a manner that it has a large contact surface with the lubricant and can thus efficiently draw thermal energy from the lubricant and dissipate the same, for example, to the ambient air or to another medium in contact with the heat exchanger, or transfer heat from this medium to the lubricant. The heat exchanger may, in particular, be a plate heat exchanger or tube bundle heat exchanger. The heat exchange medium may, in particular, be cooling water or hydraulic oil.

The use of a heat exchanger enables the use of cooling and/or heating media already provided on the ground milling machine, which are also referred to as heat exchange media, for cooling and/or heating the lubricant of the exchangeable milling drum box as well. This enables a reduction of components as well as a simple design. It is thus preferred that connections are provided on the exchangeable milling drum box, particularly an inlet and an outlet, which are connected to the heat exchanger in such a manner that a heat exchange medium can be led to and away from the heat exchanger of the exchangeable milling drum box via these connections. A heat exchange medium separate from the lubricant is thus introduced into the exchangeable milling drum box by the machine part of the ground milling machine so that the heat exchange medium has thermal contact with the lubricant via the heat exchanger. Thus, unlike the prior art, it is not the lubricant that is transferred from the exchangeable milling drum box to the machine part of the ground milling machine, but rather a heat exchange medium different from the lubricant is conveyed to the lubricant, the latter being provided exclusively on the side of the exchangeable milling drum box. This enables an efficient cooling and/or heating of the lubricant and also results in the advantages of the present invention already described.

Due to recent improvements of exchangeable milling drum boxes, the time required for removal or mounting of the exchangeable milling drum boxes from/on the ground milling machines has been significantly reduced. To save as much time as possible for connecting the lines intended to transfer the heat exchange medium from the machine part of the ground milling machine to the exchangeable milling drum box, it is therefore preferred if the connections respectively comprise a part of a quick coupling, particularly a plug-in coupling, and/or are designed as part of a multiple quick coupling, particularly a multiple plug-in coupling. These couplings are known in the prior art and consist, for example, of two components, i.e., the coupling and the nipple. Depending on the design of the quick couplings, the connections may therefore either comprise couplings and/or nipples. Through the use of quick couplings, and particularly multiple quick couplings, the lines in the exchangeable milling drum box, which lead the heat exchanger medium to and away from the heat exchanger, can be connected especially quickly and simply to the lines of the machine part of the ground milling machine, which carry the respective heat exchange medium. Particularly, preferred is the design as a multiple plug or multiple socket, with which all lines of the cooling and/or heating device and possible additional lines from the exchangeable milling drum box can be connected to the respective counterparts on the machine part of the ground milling machine, for example, hydraulic fluid lines for power, etc. To avoid the heat exchange medium from leaking out of the lines, it is also preferred if the connections comprise a leak stop, for example, a dry valve or a leak-free valve, which closes automatically if the connection between the machine part of the ground milling machine and the exchangeable milling drum box is interrupted. Additionally, or alternatively, it is preferred if the quick coupling can be closed and/or detached manually and without tools.

The more lubricant can be saved due to the compact design of the cooling and/or heating device for lubricant in the exchangeable milling drum box, the greater the effect of the present invention is. The greatest reduction in lubricant is achieved if the transmission is designed with bath lubrication and the heat exchanger is arranged in the sump of the transmission, or if the transmission is designed with circulatory lubrication and the heat exchanger is arranged in the circulation circuit of the transmission. The precise position of the heat exchanger may obviously be adapted depending on the particular structural features of the exchangeable milling drum box. Moreover, it is preferred if the heat exchanger is situated either in a same horizontal plane with the transmission or below the horizontal plane in which the transmission of the exchangeable milling drum box is situated, such that essentially no lubricant or only a small amount of lubricant flows back into the transmission from the heat exchanger when the machine is shut off. Wear to the transmission is further reduced in this manner. The horizontal plane relates to the ground milling machine located on the ground during normal operation and is particularly essentially parallel to the ground. In the present context, "below" this plane refers to the ground side.

To purify the used lubricant of contamination, it is preferred that a lubricant filter, though which the lubricant is guided, is also provided on the exchangeable milling drum box. This further reduces wear to all components which come into contact with the lubricant. Like the heat exchanger, the lubricant filter is preferably likewise arranged in or below the horizontal plane in which the transmission of the exchangeable milling drum box is located.

Principally, it is preferred if the heat exchanger is mounted on the exchangeable milling drum box at a position not too close to the ground. According to one embodiment of the present invention, it is therefore preferred that the heat exchanger is arranged on a mounting side of the exchangeable milling drum box on which the exchangeable milling drum box is designed to be mountable on the ground milling machine. In the mounted condition, the heat exchanger is thus arranged on the side (mounting side) of the exchangeable milling drum box facing the machine part of the ground milling machine. This mounting side is usually the top side of the milling drum box, which faces away from the ground during operation. In this manner, the heat exchanger is protected from negative impacts, for example, of loosened milled material. In this embodiment, the lubricant filter is likewise preferably arranged on this side of the exchangeable milling drum box, so that the lubricant filter and the heat exchanger can be readily accessed for maintenance work when the exchangeable milling drum box has been removed.

The heat exchanger and/or the lubricant filter are shielded towards the bottom and/or towards the sides preferably through wall elements of the milling drum box, which may be outer walls or shields for the milling drum chamber of the milling drum box. To further improve the protection of the heat exchanger and/or the lubricant filter, particularly in the vertical direction upwards or towards the mounting side, a protective cover may be provided for the heat exchanger and/or the lubricant filter. The protective cover covers the heat exchanger and/or the lubricant filter towards the outer side and can, in particular, be adjusted between a protection position and an open position. The protective cover is designed in such a way that it prevents mechanical impacts on the heat exchanger from the outside in the protection position, and is designed, for example, as a metal sheet, flap or maintenance flap. If a maintenance flap is used, the heat exchanger and the lubricant filter are preferably accessible for maintenance work through the flap.

The object is further achieved with a ground milling machine, particularly a road milling machine, a recycler, a stabilizer or a surface miner, having an exchangeable milling drum box according to one embodiment of the present invention. In particular, all of the aforesaid benefits and effects of the exchangeable milling drum box are likewise obtained by a ground milling machine having such an exchangeable milling drum box.

The ground milling machine is advantageously designed in such a way that it can transfer heat exchange medium to the exchangeable milling drum box and back. To this end, at least one interface is preferably arranged on the ground milling machine, which is designed for connecting a cooling circuit of the ground milling machine to the connections of the exchangeable milling drum box, in such a manner that the heat exchanger of the exchangeable milling drum box is supplied with heat exchange medium of the cooling circuit of the ground milling machine. The interface and the cooling circuit are located on the machine part of the ground milling machine. The interface enables the heat exchange medium to be conveyed from the cooling circuit of the machine part of the ground milling machine to the heat exchanger of the exchangeable milling drum box and from there back to the cooling circuit of the machine part. As previously described, contrary to the prior art, only the thermal energy to be supplied to or dissipated from the lubricant via the heat exchanger is therefore guided into or out of the exchangeable milling drum box via the heat exchange medium, while the lubricant remains solely in the exchangeable milling drum box.

This enables the cooling and/or heating media already present on the machine part of the ground milling machine to be used for cooling and/or heating the lubricant of the exchangeable milling drum box. For example, it is preferred that the cooling circuit of the ground milling machine comprises a cooling water circuit of a drive unit or a hydraulic fluid cooling circuit. In these cases, either water or hydraulic fluid, for example, hydraulic oil, is carried to and away from the exchangeable milling drum box, or the heat exchanger of the exchangeable milling drum box, by the machine part of the ground milling machine for the purposes of cooling. Heat exchangers are usually already present on the ground milling machine, with which, for example, cooling water of the drive unit is cooled. The same applies for the hydraulic fluid of the hydraulic system of the ground milling machine. These systems can now be used to likewise heat or cool the lubricant of the exchangeable milling drum box. Thus, the existing cooling system of the ground milling machine, or the machine part of the ground milling machine, is tapped into for cooling the lubricant in the exchangeable milling drum box. In this manner, thermal energy from the cooling water circuit of the quickly heating drive unit or the hydraulic system can be used to heat the lubricant during a cold start of the machine, where the lubricant is still cold and viscous. If, after prolonged operation, the lubricant of the exchangeable milling drum box reaches high temperatures, the lubricant can be cooled through the heat exchange with the fluid circuits of the machine part of the ground milling machine via the heat exchangers already present there. In this manner, efficient operation of the ground milling machine is enabled. It is obviously also possible, although less preferred, to use the medium diverted from the machine part only for purposes of cooling or only for heating.

To enable a quickest possible mounting or dismounting of the exchangeable milling drum box on the machine part of the ground milling machine, it is beneficial if the interface and the connection are part of a quick coupling, particularly a plug-in coupling, and/or are designed as part of a multiple quick coupling, particularly a multiple plug-in coupling. It is particularly preferred if the interface and the connections are respectively designed as a multiple plug or a multiple socket, whereby the connection or disconnection of the lines between the machine part of the ground milling machine and the exchangeable milling drum box is enabled in the shortest possible time. The multiple plug and the multiple socket preferably comprise connections for all lines between the machine part of the ground milling machine and the exchangeable milling drum box. In this case, merely the multiple plug has to be disconnected from or connected to the multiple socket in order to disconnect or connect all lines between the exchangeable milling drum box and the machine part of the ground milling machine, whereby time can be saved.

To provide the operator of the ground milling machine with a comprehensive overview of the operation of the machine at all times, it is additionally beneficial if a control unit is present, which records and monitors and/or displays the temperature of the transmission lubricant of the exchangeable milling drum box for the operator of the ground milling machine. The control unit may also be designed for regulating the temperature of the lubricant and/or increase and/or reduce the heat exchange between the heat exchange medium and the lubricant through the control of appropriate valves. The control unit may also be designed to generate an optical and/or acoustic warning signal for the operator of the ground milling machine if the temperature of the lubricant of the transmission of the exchangeable milling drum box is outside a predetermined range, leaves a predetermined range, and/or falls below or exceeds a defined threshold value.

The milling drum is usually hydraulically powered. Alternatively, the milling drum may also be powered by electric motors. An additional advantage of the present invention emerges if the milling drum is powered by electric motors which are particularly arranged within or on the inside of the milling drum. These types of electric motors must likewise be cooled during operation. In the prior art, for example, air coolers are used for this, in which fans direct an airflow through the electric motors and/or past their fluid cooling circuit. However, these systems have a low power density compared to the cooling and/or heating device of the present invention. Thus, it is preferred if the electric motors used for driving the milling drum are likewise cooled by the cooling and/or heating device according to one embodiment of the present invention in the described manner. Therefore, airflow in areas of the milling drum prone to dirt and dust is no longer necessary. Moreover, the increased power density results in less need for space.

Finally, in another aspect, the present invention relates to a method. One aspect of the present invention is to no longer remove the lubricant of the transmission lubricant of the exchangeable milling drum box from the exchangeable milling drum box and direct it to the machine part of the ground milling machine, but rather to cool or heat the lubricant within the exchangeable milling drum box through a cooling and/or heating medium which is led from the machine part of the ground milling machine to the exchangeable milling drum box. Accordingly, the object of the present invention described above is achieved with a method for cooling and/or heating lubricant of a transmission of a milling drum of a ground milling machine rotatably mounted in an exchangeable milling drum box, the method comprising the steps: supplying a cooling and/or heating medium from the ground milling machine to the lubricant located in a lubrication device arranged in an exchangeable milling drum box; cooling and/or heating the lubricant through heat transfer between the cooling and/or heating medium and the lubricant; and discharging the cooling and/or heating medium from the exchangeable milling drum box to the ground milling machine or the machine part of the ground milling machine. Through this method, the advantages and effects of the present invention already described above can be achieved. Thus, according to one embodiment of the present invention, the cooling and/or heating medium is led from the machine part of the ground milling machine to the lubricant of the exchangeable milling drum box, whereas the lubricant of the exchangeable milling drum box itself is not exchanged with the machine part, as was previously the case, for the purpose of cooling and/or heating. The cooling and/or heating medium is a heat-conducting medium of the ground milling machine separate from the lubricant and is also designated as a heat exchange medium. This does not involve the lubricant itself, which is arranged only in the exchangeable milling drum box.

The cooling and/or heating medium is therefore either heated or cooled by the lubricant, depending on the operational situation. In other words, the cooling and/or heating medium thus conveys heat either to or away from the lubricant. To maintain this cycle, it is advantageous if the cooling and/or heating medium is cooled and/or heated on the ground milling machine, or more specifically on the machine part, outside the exchangeable milling drum box. This way, heat can be continuously supplied to or removed from the lubricant in the exchangeable milling drum box.

As also previously described, cooling water and/or hydraulic fluid of a cooling circuit of the ground milling machine may be used as a cooling and/or heating medium. The use of these already existing cooling circuits reduces the required modification measures and, therefore, the costs of the present invention.

BRIEF DESCRIPTION OF THE DRAWINGS

The present invention will be described in further detail below based on the exemplary embodiments shown in the figures. In the schematic figures:

FIG. 4 shows an exemplary embodiment of the arrangement of a cooling and/or heating device on the ground milling machine; and FIG. 5 shows another exemplary embodiment of the arrangement of a cooling and/or heating device on the ground milling machine.

Like components are designated by like reference signs in all figures. Reference signs designating recurring components may be omitted in some figures.

DETAILED DESCRIPTION OF THE INVENTION

Figure 1:
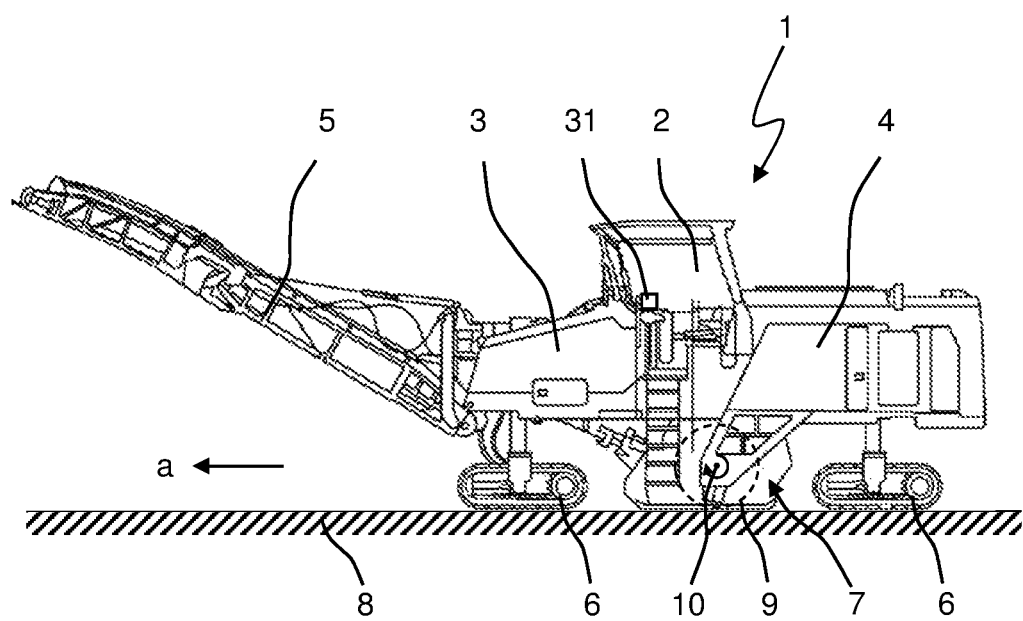
FIG. 1 is a side view of a ground milling machine.

FIG. 1 shows a generic ground milling machine 1, in this case a large, center rotor type road milling machine. The ground milling machine 1 comprises an operator platform 2 and a machine frame 3. An exchangeable milling drum box 7, in which a milling drum 9 is mounted so as to be rotatable about a rotation axis 10, is located between two pairs of travelling devices 6 in the middle of the machine when viewed in the working direction. All components of the ground milling machine 1 are supplied with energy or driven by a drive unit 4, which usually comprises a diesel combustion engine. During working operation, the ground milling machine 1 moves in the working direction a over the ground 8, with the rotating milling drum 9 continuously removing ground material and transferring the removed milled material via the discharge conveyor 5 to a transport vehicle (not depicted), which carries the milled material away. A control device 31 is also located on the operator platform 2, which coordinates the functions of the ground milling machine 1, such as the method according to one embodiment of the present invention or the functions of the exchangeable milling drum box 7 according to one embodiment of the present invention and the cooling and/or heating device (see FIGS. 4 and 5).

Figure 3:
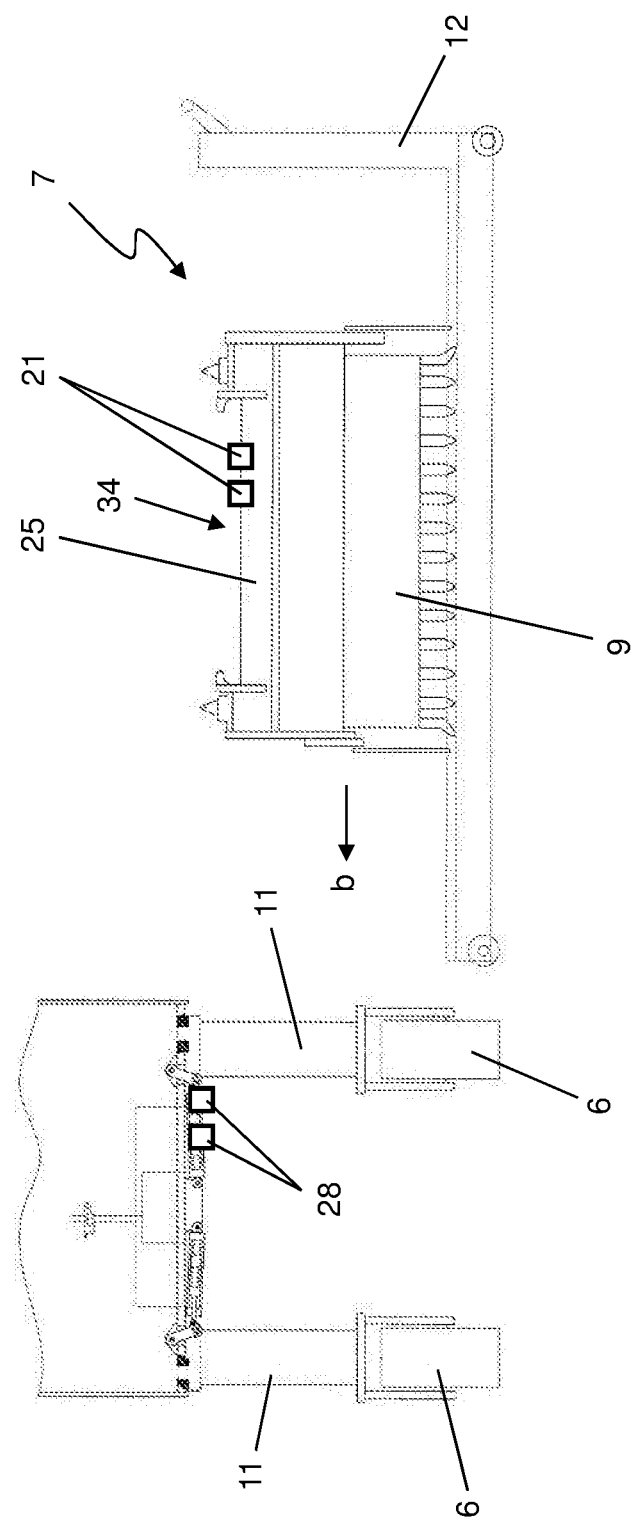
FIG. 3 shows a partial view of the machine part of the ground milling machine and a dismounted exchangeable milling drum box.

The milling drum box of the ground milling machine 1 is designed as a so-called exchangeable milling drum box 7, which is illustrated by FIG. 3. FIG. 3 shows a partial front view of the ground milling machine 1 of FIG. 1. For example, the front pair of travelling devices 6 is depicted, with their lifting columns 11 greatly extended for purposes of mounting or dismounting the exchangeable milling drum box 7. The exchangeable milling drum box 7 is located on the roll-off loading platform 12 in a dismounted state. To mount the exchangeable milling drum box 7 on the machine part of ground milling machine 1, it must be moved with the roll-off loading platform 12 in the insertion direction b below the depicted machine part of the ground milling machine 1. The exchangeable milling drum box 7 can then be mounted on the ground milling machine 1 as described in the publications mentioned above. During this process, the connections 21 arranged on the exchangeable milling drum box 7 can also be connected to the interface 28 on the machine part of the ground milling machine 1 to enable the conduction of heat exchange medium between the machine part of ground milling machine 1 and the exchangeable milling drum box 7, which will be described below. The interface 28 and the connections 21 are designed in the present case as a multiple plug and multiple socket in the sense of a multiple plug-in coupling.

Figure 2:
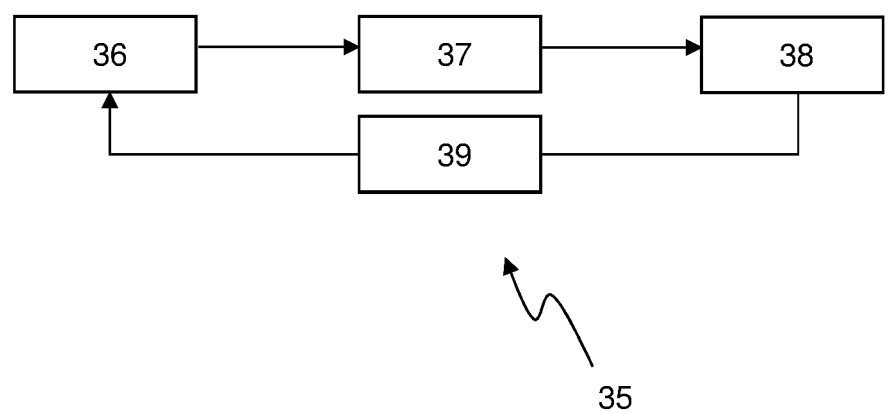
FIG. 2 is a flow chart of the method.

FIG. 2 shows the sequence of the method 35 according to one embodiment of the present invention. In a first step 36, a cooling and/or heating medium is conveyed from the ground milling machine 1 or the machine part of the ground milling machine 1 to the lubricant at the exchangeable milling drum box 7. In the next step 37, the lubricant is either heated or cooled by the cooling and/or heating medium depending on the operational situation of the ground milling machine 1. For example, the lubricant is heated by the cooling and/or heating medium, particularly after a cold start of the ground milling machine 1, and is then cooled during continued operation of the ground milling machine 1. The cooling and/or heating medium is then conveyed from the exchangeable milling drum box 7 back to the ground milling machine 1 or to the machine part of the ground milling machine 1. Depending on what operational situation the ground milling machine 1 is in, the cooling and/or heating medium is cooler or warmer in this step than in step 36. For this reason, the cooling and/or heating medium is cooled or heated in a further process step 39 in the ground milling machine 1 or in a machine part of the ground milling machine 1. This cooling and/or heating preferably takes place in a cooling circuit already present on the ground milling machine 1, as will be described in more detail below.

FIG. 4 shows a first exemplary embodiment of the arrangement according to the present invention. As indicated by the dotted boxes, all elements shown on the left side of the figure are located in the machine compartment 23 or machine part 23, i.e., they are arranged on the machine part of the ground milling machine 1, while the elements depicted on the right side in FIG. 4 are located in the exchangeable milling drum box compartment 24, i.e., they are arranged on the exchangeable milling drum box 7. The components depicted inside the exchangeable milling drum box compartment 24 are therefore dismounted from the machine part of the ground milling machine 1 together with the exchangeable milling drum box 7 when the latter is dismounted.

In the exemplary embodiment shown in FIG. 4, the exchangeable milling drum box 7 comprises a transmission 13 with bath lubrication and a cooling and/or heating device 29. The lubrication device 33 of the transmission 13 comprises a sump 15 for lubricant. An engine 17, for example, a diesel combustion engine as a part of the drive unit 4, is located on the side of ground milling machine 1 in the machine compartment 23. The engine 17 has a cooling circuit 27, which is filled, for example, with cooling water, and which cools other components of the ground milling machine 1, particularly of the machine part of the ground milling machine 1, as well as the engine 17 itself. Alternatively, the cooling circuit 27 may also be a hydraulic fluid cooling circuit, in which hydraulic fluid of the hydraulic system of ground milling machine 1 is cooled. The hydraulic fluid as well as the cooling water will hereafter be collectively referred to as heat exchange medium or as cooling and/or heating medium. The fact that additional components may also be arranged in the cooling circuit 27 is indicated by the dotted lines in the figure. DE 10 2014 008 749 A1, for example, describes how the cooling device of the cooling circuit 27 may be designed. The engine 17 runs a pump 18, which circulates the heat exchange medium in the cooling circuit 27. Accordingly, the heat exchange medium passes through a first heat exchanger 19 in the cooling circuit 27, which is designed, for example, as an oil/air or as a water/air heat exchanger and which effects dissipation of excess heat from the heat exchange medium to the ambient air.

The connections 21 comprise a connection for a supply and a connection for a discharge of heat exchange medium. The heat exchange medium of the cooling circuit 27 is led via the interface 28 of the machine part of the ground milling machine 1 and the connections 21 of the exchangeable milling drum box 7, which are collected in the present case in a multiple quick coupling 32, from the machine compartment 23 to the exchangeable milling drum box compartment 24, where it is led via the lines 26 to a second heat exchanger 20 located in the sump 15 of the lubrication device 33. The second heat exchanger 20 enables the heat exchange between the lubricant in the lubrication device 33 and the heat exchange medium of the cooling circuit 27. Overall, therefore, heat exchange medium is led from the machine part of the ground milling machine 1 out of the cooling circuit 27 via the interface 28 and the connection 21 to the lubrication device 33 of the exchangeable milling drum box 7, where the heat exchange medium passes through the second heat exchanger 20 and is then led back into the cooling circuit 27 via the connections 21 and the interface 28. In this manner, the lubricant of lubrication device 33 remains only in the exchangeable milling drum box compartment 24, so that no lines are necessary for conveying the lubricant from the exchangeable milling drum box 7 to the machine part of the ground milling machine 1, as is common in the prior art. Thus, lubrication device 33 according to the present invention requires significantly less lubricant, which results in the advantages of the present invention.

FIG. 5 shows another embodiment of the present invention, which is likewise divided into a machine compartment 23 and an exchangeable milling drum box compartment 24. The following discussion will focus on the differences between this embodiment and the embodiment shown in FIG. 4. The embodiment of FIG. 5 comprises a transmission 14 with circulation lubrication implemented by the lubrication device 33. In the exemplary embodiment of FIG. 5, the lubrication device 33 comprises a sump 15 for lubricant, from which lubricant is pumped in a circulation circuit 30 via the pump 16. In the circulation circuit 30, the lubricant passes through the second heat exchanger 20 and a lubricant filter 22. According to the embodiment shown in FIG. 5, again, all components of the lubrication device 33 are located on the exchangeable milling drum box 7 or in the exchangeable milling drum box compartment 24. Here again, heat exchange medium of the cooling system 27 is conveyed by the pump 18, which is driven by the motor 17, via the interface 28 and the connections 21 to the second heat exchanger 20, where it is put into thermal contact with the lubricant of the lubrication device 33.

Due to the design of the lubrication device 33 as a circulation lubrication, the arrangement of the second heat exchanger 20 on the exchangeable milling drum box 7 is relatively variable. For example, the second heat exchanger 20 and also the lubricant filter 22 may be arranged in an indentation 25 on the mounting side 34 (see FIG. 3) of the exchangeable milling drum box 7. The indentation 25 is usually intended for additional weights in order to provide a counterweight for the operation of the milling drum 9. According to the present invention, a part of these additional weights may be replaced by the second heat exchanger 20 and/or the lubricant filter 22. According to the embodiment shown in FIG. 5, again, the lubrication device 33 is only located on the exchangeable milling drum box 7 or in the exchangeable milling drum box compartment 24. A considerable amount of lubricant is saved here as well, which results in the mentioned advantages of the present invention.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. An exchangeable milling drum box for a ground milling machine, comprising:
   a milling drum rotatably mounted in the exchangeable milling drum box; and
   a transmission, via which the milling drum can be driven, the transmission comprising a lubrication device with a lubricant,
   wherein the exchangeable milling drum box comprises a cooling and/or heating device for lubricant, and that the cooling and/or heating device comprises a heat exchanger.

2. The exchangeable milling drum box according to claim 1,
   wherein connections are provided on the exchangeable milling drum box which are connected to the heat exchanger in such a way that a heat exchange medium can be led to and away from the heat exchanger.

3. The exchangeable milling drum box according to claim 2,
   wherein the connections each comprise a part of a quick coupling and/or are designed as part of a multiple quick coupling.

4. The exchangeable milling drum box according to claim 1,
   wherein the transmission is designed with a bath lubrication and the heat exchanger is arranged in a sump of the transmission, or that the transmission is designed with a circulatory lubrication and the heat exchanger is arranged in a circulation circuit of the transmission.

5. The exchangeable milling drum box according to claim 1,
   wherein a lubricant filter is provided on the exchangeable milling drum box, through which the lubricant is led.

6. The exchangeable milling drum box according to claim 1,
   wherein the heat exchanger is arranged on a mounting side (34) of the exchangeable milling drum box, on which the exchangeable milling drum box is designed such that it can be mounted on a ground milling machine.

7. A ground milling machine having an exchangeable milling drum box according to claim 1.

8. The ground milling machine according to claim 7,
   wherein at least one interface is arranged on the ground milling machine, which is designed for connecting a cooling circuit of the ground milling machine with connections of the exchangeable milling drum box, such that the heat exchanger of the exchangeable milling drum box is supplied with heat exchange medium of the cooling circuit of the ground milling machine.

9. The ground milling machine according to claim 8,
   wherein the cooling circuit of the ground milling machine comprises a cooling water circuit of a drive unit or a hydraulic fluid cooling circuit.

10. The ground milling machine according to claim 8,
    wherein the interface and the connections comprise parts of a quick coupling and/or are designed as part of a multiple quick coupling.

11. The ground milling machine according to claim 7,
    wherein a control unit is provided, which records and monitors and/or displays the temperature of the lubricant of the transmission of the exchangeable milling drum box for the operator of the ground milling machine.

12. The ground milling machine according to claim 7,
    wherein the ground milling machine comprises a road milling machine, a recycler, a stabilizer or a surface miner.

13. The exchangeable milling drum box according to claim 1,
    wherein the ground milling machine comprises a road milling machine, a recycler, a stabilizer or a surface miner.

14. A method for cooling and/or heating lubricant of a transmission of a milling drum rotatably mounted in an exchangeable milling drum box of a ground milling machine, comprising:
    supplying cooling and/or heating medium from the ground milling machine to the lubricant located in a lubrication device arranged on the exchangeable milling drum box;
    cooling and/or heating the lubricant through heat transfer between the cooling and/or heating medium and the lubricant; and
    discharging the cooling and/or heating medium from the exchangeable milling drum box to the ground milling machine.

15. The method according to claim 14,
    wherein cooling and/or heating the cooling and/or heating medium occurs on the ground milling machine, outside the exchangeable milling drum box.

16. The method according to claim 14,
wherein cooling water and/or hydraulic fluid of a cooling circuit of the ground milling machine is used as the cooling and/or heating medium.

\* \* \* \* \*